(12) United States Patent
Kaestle et al.

(10) Patent No.: US 10,902,268 B2
(45) Date of Patent: Jan. 26, 2021

(54) DETECTION OF THE PRESENCE OF STATIC OBJECTS

(71) Applicant: OSRAM GMBH, Munich (DE)

(72) Inventors: Herbert Kaestle, Traunstein (DE); Fabio Galasso, Garching (DE); Ling Wang, Eching (DE); Michael Eschey, Wehringen (DE); Meltem Demirkus Brandlmaier, Munich (DE)

(73) Assignee: OSRAM GmbH, Munich (DE)

( * ) Notice: Subject to any disclaimer, the term of this patent is extended or adjusted under 35 U.S.C. 154(b) by 88 days.

(21) Appl. No.: 16/325,619

(22) PCT Filed: Aug. 11, 2017

(86) PCT No.: PCT/EP2017/070466
§ 371 (c)(1),
(2) Date: Feb. 14, 2019

(87) PCT Pub. No.: WO2018/033488
PCT Pub. Date: Feb. 22, 2018

(65) Prior Publication Data
US 2019/0188492 A1    Jun. 20, 2019

(30) Foreign Application Priority Data
Aug. 19, 2016   (DE) .................. 10 2016 115 414

(51) Int. Cl.
*G06K 9/00* (2006.01)
*G08B 13/196* (2006.01)
(Continued)

(52) U.S. Cl.
CPC ....... *G06K 9/00778* (2013.01); *G06K 9/6215* (2013.01); *G08B 13/19* (2013.01);
(Continued)

(58) Field of Classification Search
CPC ........ G08B 13/19684; G08B 13/19695; G08B 13/19656; G08B 13/19608;
(Continued)

(56) References Cited

U.S. PATENT DOCUMENTS

2004/0233284 A1    11/2004  Lesesky et al.
2007/0256105 A1*   11/2007  Tabe .................... G08B 25/085
                                                                725/78
(Continued)

FOREIGN PATENT DOCUMENTS

DE       9409202 U1     8/1994
EP       2442555 A2     4/2012
(Continued)

OTHER PUBLICATIONS

PCT; App. No. PCT/EP2017/070466; International Search Report dated Nov. 3, 2017.

*Primary Examiner* — Diane D Mizrahi
(74) *Attorney, Agent, or Firm* — Viering, Jentschura & Partner MBB

(57) ABSTRACT

The presence of a stationary object is to be reliably recognized. Thereto, a presence detection device for detecting a presence of an object in its environment is provided, which comprises a movement detection unit for detecting an initial movement of the object in the environment of the presence detection device and for outputting a movement signal depending on the detection as well as a control unit for generating an activation signal depending on the movement signal. Moreover, the presence detection device comprises a camera, which can be activated by the activation signal, for obtaining a video signal of the environment of the presence detection device and an evaluation unit for generating a presence signal relating to the presence of the object by evaluating the video signal.

20 Claims, 1 Drawing Sheet

(51) Int. Cl.
*G08B 13/19* (2006.01)
*H05B 47/19* (2020.01)
*H05B 47/105* (2020.01)
*G06K 9/62* (2006.01)
*H04N 7/18* (2006.01)

(52) U.S. Cl.
CPC . *G08B 13/19604* (2013.01); *G08B 13/19608* (2013.01); *G08B 13/19695* (2013.01); *H04N 7/188* (2013.01); *H05B 47/105* (2020.01); *H05B 47/19* (2020.01); *Y02B 20/40* (2013.01)

(58) Field of Classification Search
CPC ........ G08B 13/19645; G08B 13/19604; G08B 13/19; G08B 13/19671; G08B 1/19682; G08B 13/19697; G06K 9/00288; G06K 9/00771; G06K 9/2018; G06K 2009/00738; G06K 9/00201; G06K 9/00221; G06K 9/00979; G06K 9/2027; G06K 9/00671; G06K 2209/21; G06K 9/00604; G06K 9/00342; G06K 9/00711; G06K 9/2081; G06K 9/22; G06K 9/6256; G06K 9/00778; G06K 9/6215; H05B 47/19; H05B 47/105; H05B 47/125; H04N 7/188; Y02B 20/40
See application file for complete search history.

(56) References Cited

U.S. PATENT DOCUMENTS

| | | |
|---|---|---|
| 2015/0035437 A1 | 2/2015 | Panopoulos et al. |
| 2015/0290453 A1* | 10/2015 | Tyler .................... A61B 5/4005 607/134 |
| 2016/0027262 A1 | 1/2016 | Skotty et al. |
| 2016/0027269 A1 | 1/2016 | Trundle et al. |
| 2019/0080313 A1* | 3/2019 | Van Wiemeersch ........................ B62D 15/027 |
| 2020/0134996 A1* | 4/2020 | Siminoff .......... G08B 13/19684 |

FOREIGN PATENT DOCUMENTS

| | | |
|---|---|---|
| WO | 2011/085420 A1 | 7/2011 |
| WO | 2012030189 A2 | 3/2012 |
| WO | 2014/100784 A1 | 6/2014 |

* cited by examiner

DETECTION OF THE PRESENCE OF STATIC OBJECTS

CROSS-REFERENCE TO RELATED APPLICATIONS

This application is a U.S. national phase application filed under 35 U.S.C. § 371 of International Application Number PCT/EP2017/070466, filed Aug. 11, 2017, designating the United States, which claims priority to German Patent Application No. 10 2016 115 414.8, filed on Aug. 19, 2016.

FIELD

The present invention relates to a presence detection device for detecting a presence of an object in its environment. Moreover, the present invention relates to a corresponding method for detecting a presence of an object in a preset area.

BACKGROUND

Current light management systems are usually based on movement detectors, which usually respond to moving objects. The most inexpensive sensors for fast detection and event-controlled light management systems are so-called "passive infrareds" (PIRs). However, such passive infrared detectors are unreliable caused by the false triggering of an alarm by loose material, which flaps in the wind, moving leaves or moving animals.

An additional problem in movement-based sensors is in that they usually do not detect persons, who stay in a certain area in stationary manner or with low activity. Such a situation for example occurs in watching television, in sitting in front of the computer or in reading a book etc. If movement detectors are employed in such situations to automatically turn on the light in the room, thus, these persons are often forced to for example wave with the arms in order that the light is again turned on after a preset timeout.

Traditional movement sensors handle the shortage of the capability of presence detection with low activity by activating a timeout after the last movement detection. However, the timeout can barely be correctly adjusted in each situation since a room is for example sometimes entered only for few minutes and another time for multiple hours. Thus, if the timeout is adjusted too short, the persons are mostly forced to wave with the arms in order that the light goes on again, while the light remains turned on unnecessarily long in the other case.

Different types of movement detectors are available on the market. They are based on different detector technologies. As already mentioned, many detectors operate infrared-based (PIR detectors). They detect variations of the infrared energy, which is for example attributable to emitted body heat.

Other detectors, which are able to detect movements, operate microwave-based. They for example detect the microwave Doppler shift in a reflected signal of a moving object.

Moreover, ultrasonic sensors for detecting movements are also usual. These ultrasonic detectors detect ultrasonic Doppler shifts in the reflected signal of a moving object. As also the microwave detectors, the ultrasonic detectors are active sensors because they emit own test signals for detection of a moving object in the room. In contrast, the passive infrared sensors content themselves with receiving infrared radiation, which is generated and emitted by the moving object itself.

Movement detectors are employed to for example trigger circuits. Such a circuit can be provided in the area of a building lighting. However, a circuit activated by a movement detector can also be used for example for cameras. Thus, a capture of a camera can start if it is triggered by a detected movement. Such a camera with movement sensor is known from the company ACTi. For example, this company produces the models ACM-4201, ACM-4001, TCM-4201 and TCM-4001, which have such a construction. Therein, a passive infrared sensor (PIR) for triggering the camera is in particular installed in a prismatic camera. The installed passive infrared sensor detects the movement of a person by capturing temperature variations in a scene. The sensor camera also operates in total darkness and also then triggers, respectively. The heat of a human body wandering through the scene triggers the PIR sensor. An alarm signal is for example immediately sent to a control center via a data network. Since the digital output of the camera can be connected to external lamps or alarm sirens, these appliances are activated immediately after the detected movement. Thus, an intruder, who enters a guarded area in complete darkness, can for example be captured by a high-quality video capture if for example a corresponding lighting is turned on by the camera at the same time. However, this camera, which is triggered by a movement sensor, is not capable of detecting an object, in particular a person, even if it does not move, because the capture for example stops after 2 seconds or again after a preset turn-off time, and is only again reactivated when a new movement is detected.

Thus, the object of the present invention is in further determining the presence of a triggering object even if the object further remains stationary or immovable in the observation area.

SUMMARY

According to the invention, this object is solved by a presence detection device according to claim 1 as well as a method according to claim 15. Advantageous developments of the invention are apparent from the dependent claims.

Accordingly, a presence detection device for detecting a presence of an object in its environment is provided. Accordingly, a preset object can be captured and identified by the presence detection device in its environment. Thereto, the presence detection device comprises a movement detection unit for detecting a movement of the object in the environment of the presence detection device and for outputting a movement signal depending on the detection. With the aid of the movement detection unit, it can thus first be detected if an object moves in the environment of the presence detection device, and if this is the case, thus, a corresponding movement signal is output. The movement signal can for example be in that a signal level or a signal shape changes.

Moreover, the presence detection device comprises a control unit for generating an activation signal depending on the movement signal. Thus, the movement signal is converted into an activation signal with the aid of the control unit to thereby be able to activate another unit. In a configuration, this control unit is a driver generating a corresponding driver signal from the movement signal. Optionally, the control unit is also integrated in the unit to be activated (e.g. camera) and only represents a corresponding interface.

In particular, the presence detection device includes a camera, which can be activated by the activation signal, for obtaining a video signal of the environment of the presence detection device. Such a camera is capable of capturing an image of the environment of the presence detection device or of the area around the presence detection device in certain time intervals. This can be a video sequence, but also individual captures for example in second intervals. The camera starts with its captures as soon as it has been activated by the activation signal.

Furthermore, the presence detection device includes an evaluation unit for generating a presence signal relating to the presence of the object by evaluating the video signal. This means that the evaluation unit evaluates the video signal to the effect if the object is located in the environment of the presence detection device, which was for example not present with respect to a default state or which can be directly detected due to its property. Altogether, the detection of a movement thus is used to initiate the detection of a presence. Thereby, the presence of an object can be determined even if the object only initially moves and subsequently stays immovable. Thereby, the presence can in particular be uniquely detected even in this phase of immobility or static presence. Preferably, the presence detection device remains activated as long as the presence of the object is detected by it.

Therein, the camera is controllable by the control unit with the presence signal such that the camera is kept active at least as long as the presence of the object is determined by the evaluation unit. Thus, the monitoring camera for example remains turned on in any case as long as a person is for example present in a room, which is monitored by the camera. Thereby, the person can be continuously monitored.

In a special configuration, the evaluation unit can be formed to perform a subtraction between an image of the video signal and a preset image of the environment of the presence detection device without the object in evaluating the video signal. This means that an image of the environment is first captured, wherein the objects captured therein are not to be monitored with respect to their presence (background). If a further object now gets into the capturing range of the presence detection device by movement, thus, the camera is activated and the evaluation unit captures the presence of the new object by the subtraction.

Preferably, the camera remains turned on and the presence detection device remains activated as long as the object is located in the capturing range of the presence detection device.

According to an alternative configuration, the evaluation device is formed to perform a similarity analysis between an image of the video signal and a preset sample image or reference image of the object in evaluating the video signal. Such a similarity analysis has for example an advantage with respect to the simple subtraction of images if the lighting conditions for example change in a room to be monitored. The simple subtraction would then already provide a differential signal, while the similarity analysis can well be capable of associating differently lighted objects with each other such that the supposed presence of a new object is thereby not erroneously determined.

The presence detection of the similarity analysis to a reference image also has the advantage that an object classification automatically occurs, whereby the presence analysis only relates to an object of a certain type, e.g. a person. A shifted-in chair would remain unnoticed by the presence detection.

In a preferred embodiment, the evaluation unit is formed to previously learn one or more characteristics of an object or an object type from preset training image data (training images, training phase) to thereby subsequently recognize the presence of the object based on the characteristic or characteristics extracted from the video signal and to correspondingly form the presence signal. In this manner, it is possible to train the presence detection device to the effect to recognize a preset object in the video signal. This has the advantage that the presence detection device can be trained to any objects and object types, respectively, with high reliability.

In particular, fuzzy technology can also be employed to also recognize similar objects, which are not absolutely equal or identical to the learned object characteristics. For example, this has advantages in the presence detection of persons in all of their different appearances.

According to a further configuration, the movement detection unit can comprise an infrared sensor, by which a movement of the object is detectable based on infrared radiation. Such infrared sensors are very reliable in the detection of movements. However, microwave sensors, ultrasonic sensors, acoustic sensors etc. can alternatively also be employed for the movement detection unit.

The object, the presence of which is to be detected, can be a person or an animal or a non-living object. Thus, the presence of a person in a room can for example be monitored. Thereto, it is beneficial if the evaluation unit is trained to the detection of persons.

Further alternatively, the object can also be an item, the presence of which is to be monitored. For example, this can be required in manufacturing plants on conveyor belts and the like. The item can also be detected by the presence detection if it does not or no longer move.

The presence detection device can further comprise a lighting unit, which can be activated by the activation signal. In a configuration, the actual presence detector including movement detection unit, control unit, camera and evaluation unit can be accommodated in a common housing together with the lighting unit. However, according to another configuration, the lighting unit can also be arranged outside of the housing of the actual presence detector. This would for example be the case in a room, which has an own lighting, which is only controlled by the actual presence detector.

Furthermore, it can be provided that the lighting unit remains turned on as long as the object is located in the environment according to the presence signal. Thus, if a person is for example present in a room, the lighting unit is not turned off until the person leaves the room. Thereby, it can be ensured that the room is continuously lighted as long as a person stays in the monitored room or in the monitored environment.

The camera of the presence detection device can comprise a video sensor, which is based on CMOS technology. Such video sensors allow inexpensively creating high-quality video sequences. However, other camera technologies can alternatively also be employed.

The control unit of the presence detection device can be formed to keep the presence detection device activated until the object is no longer present in the environment. This means that the presence detection device is activated by the movement detection unit, but is deactivated by the camera-based evaluation unit. The deactivation of the presence detection device in absence of the object has the advantage of the energy saving for the time, in which the object is no longer present in the environment of the presence detection device.

In a development, the object is one or more persons, who are detected by the movement detection unit in an area of the environment, wherein the lighting unit is controllable by means of the control unit for generating a lighting scene depending on the area, in particular such that only the area is lighted in the environment. Thus, if a group of persons is for example located in a larger room, which can be extensively lighted, thus, it can be provided that only that area is lighted, in which the group of persons is located. Then, remaining areas of the room are not lighted such that energy can thereby be saved. However, the lighting scene can also be configured such that besides the area, in which the group of persons is located, the area of the exit or for example an area of a table, on which beverages are located, for example also always remains lighted as long as the group of persons is present in the room. Optionally, connection sections between the mentioned areas also remain lighted.

In a further advantageous configuration, it is provided that the object is a person, who is detected in the environment of the movement detection unit, a movement path of the person in the environment is predictable by the movement detection unit, and the control unit is formed to control the lighting unit depending on the movement path, in particular such that only or at least the predicted movement path or a part thereof is lighted. Accordingly, the movement detection unit for example evaluates multiple images consecutively in time to estimate a movement path of the person therefrom. If two ways for example bifurcate on a parking lot, only that one is lighted, towards which the person moves. Thus, energy can be saved on the one hand and a way can be lighted on the other hand, which is not yet taken by the person, which is not possible by simple movement sensors. This gives additional safety to the person, since it is lighted in anticipatory manner.

A further configuration provides that the movement detection unit can be turned off by the control unit as soon as an object is detected in the environment according to the presence signal. Thus, as soon as the presence of the object, e.g. of the person, in the environment is determined, it is no longer required to keep the movement detection unit active because the camera is already active and ensures the monitoring. Thus, the PIR sensor or each other installed movement detector can for example be turned off to save energy.

In a further embodiment, the lighting unit can be turned off by the control unit after a predetermined period of time depending on that point of time, at which the object leaves the environment according to the presence signal. Thus, if the person is for example no longer detected and the presence signal signals the clear absence thereof, a certain turn-off time (typically 10 sec to 1 min) can be used to turn off the light and to reinitialize the movement detector for the subsequent dark period. Optionally, the activations of camera and lighting unit are also coupled to each other.

According to the invention, the above mentioned object is also solved by a method for detecting a presence of an object in a preset area, by detecting a movement of the object in the preset area, generating a movement signal depending on the detection, generating an activation signal depending on the movement signal, obtaining a video signal of the preset area triggered by the activation signal and generating a presence signal relating to the presence of the object in the preset area by evaluating the video signal, wherein the camera (4) is controlled by the presence signal such that the camera (4) is kept active at least as long as the presence of the object is determined by the evaluation unit (5).

The developments and advantages mentioned above in connection with the presence detection device can also be transferred to the method according to the invention. Accordingly, the functional features described there are also to be regarded as method features.

BRIEF DESCRIPTION OF THE DRAWINGS

Now, the present invention is explained in more detail based on the attached drawings, in which there is shown.

DESCRIPTION OF THE PREFERRED EMBODIMENTS

The embodiments described in more detail below represent preferred embodiments of the present invention. Therein, it is to be noted that the individual features can be realized not only in the described feature combinations, but also alone or in other technically reasonable feature combinations.

The present invention is based on the realization that conventional movement detectors are prone to false alarm with loose and flapping materials or moving small animals if their sensitivity is increased to detect slight activities of a person. Therefore, in the area of the installation technology (e.g. "smart home" or "smart office"), it is more beneficial to use an occupancy or presence detector based on image processing to in particular detect the stationary presence in a room. However, there is the problem that video sensors with standard cameras for the visible range are not employable in dark rooms. Rather, a suitable light turn-on concept has to be present to be able to operate with a standard camera.

Thus, the basic idea of the present invention is based on activating the presence detection by movement detection and basing the presence detection on image processing. Optionally, a lighting can also be activated for or upon activation of the presence detection to improve or allow the presence detection.

Figure 1:
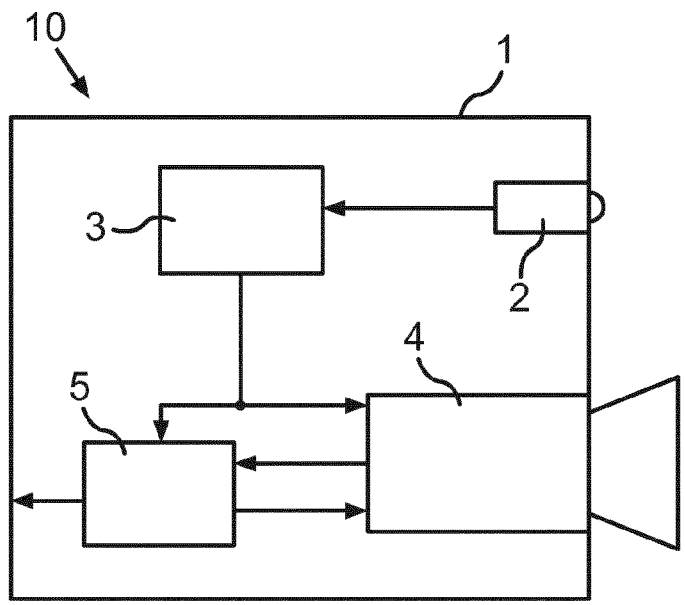
FIG. 1 a block diagram of a presence detection device according to the invention, and
FIG. 2 a schematic view for illustrating the method according to the invention.

In the example of FIG. 1, a presence detection device according to an embodiment is schematically illustrated. In this example, it comprises a housing 1, in which a movement detection unit 2 is integrated. This movement detection unit can for example be a (passive) infrared sensor. However, other movement sensors can alternatively also be employed hereto.

The movement detection unit 2 provides a movement signal to a control unit 3. This control unit 3 generates an activation signal from the movement signal. Hereby, only a voltage level adaptation or impedance adaptation is optionally effected. The control unit 3 can be integrated in the movement detection unit 2 as an output driver. However, the control unit 3 can alternatively also be integrated in a downstream camera 4 quasi as an input interface.

The activation signal of the control unit 3 is supplied to the camera 4. The camera 4 can be activated by the activation signal. For example, an activation of the camera 4 is effected if the movement detection unit 2 has noticed a moving object in the environment of the presence detection device, i.e. in the capturing range of the movement detection unit.

The camera 4 can be a standard camera in the visible range of the light. However, the camera can also be an infrared camera or the like. Moreover, the camera 4 can for example create one-dimensional or two-dimensional "images" and video sequences, respectively.

The camera 4 provides a video signal to an evaluation unit 5. Image processing occurs in the evaluation unit 5, by which it is possible to recognize and identify an object in the video signal, respectively. Either an object, i.e. any object, is to be only unspecifically captured, or it is to be specifically captured, i.e. be identified as an object type. For example, capture of a person belongs to the latter, who is to be differentiated from other objects, which are not persons.

With regard to the unspecific detection of an object, a simple subtraction can for example be effected in the image processing. Thereto, a current image of the camera 4 is subtracted from a previously captured image of the environment in the evaluation unit 5. If a difference results upon subtraction, thus, the environment has changed. Thus, under certain additional external circumstances, it can be assumed that an object has additionally come into the environment.

An improved image processing can be based on a similarity analysis. Namely, if a current image of the video signal of the camera 4 is for example similar to a previously captured image of the environment, it can be assumed that an additional object has not come into the environment. Different lighting conditions of the environment or of the capturing range either do not change anything thereto. Optionally, optical structures can be preset for the presence recognition for the similarity analysis. Thus, the contour of a person could for example be preset and the evaluation unit 5 for example examines by correlation if an object is present in the current image of the camera 4, which corresponds to the contour of a person. Thereby, with the aid of the similarity analysis, it can optionally be inferred that a person stays in the environment of the presence detection device, i.e. in the capturing range of the camera 4. In order to cover the case of the different appearances and postures (poses etc.) of the objects, correspondingly many reference images with the (optical structures) have to be preset for consideration in the similarity analysis.

In a development, the image processing of the evaluation unit 5 can comprise a learning algorithm. By such a learning algorithm, the presence detection device can be trained to recognize persons per se, to recognize movement patterns of persons and to recognize different postures of one and the same person. Thereby, persons, who do not move, can for example also be specifically noticed in the video signal. For example, a person, who watches television, who reads or who sleeps, can thus be uniquely recognized and identified, respectively. The detection approach with taught algorithms currently achieves the highest accuracy and reliability.

However, the image processing in any form can also be directed to animals or other objects, in particular certain items. Thus, wild animals or else production plants can for example also be specifically monitored for their equipping.

If the evaluation unit 5 recognizes the presence of a person or another object, thus, it generates a corresponding presence signal. The camera 4 can in turn be controlled by this presence signal. For example, the camera 4 is kept active as long as the presence of the object is determined by the evaluation unit 5. Optionally, after termination of the presence, a certain follow-up time of the camera 4 can also be provided. After turning off the camera 4, the movement detector 2 and the control unit 4, respectively, can then again be activated if they were deactivated in the meantime.

However, the presence signal of the evaluation unit 5 can also be provided to the outside from the housing 1 of the presence detection device via an interface. Optionally, the activation signal of the control unit 3 or the movement signal of the control unit 2 is also supplied to the evaluation unit to consider them already in the presence signal. Namely, already with the first capture of the movement of an object by the movement detection unit 2, a presence can be inferred such that the presence signal would have to be correspondingly formed.

Figure 2:
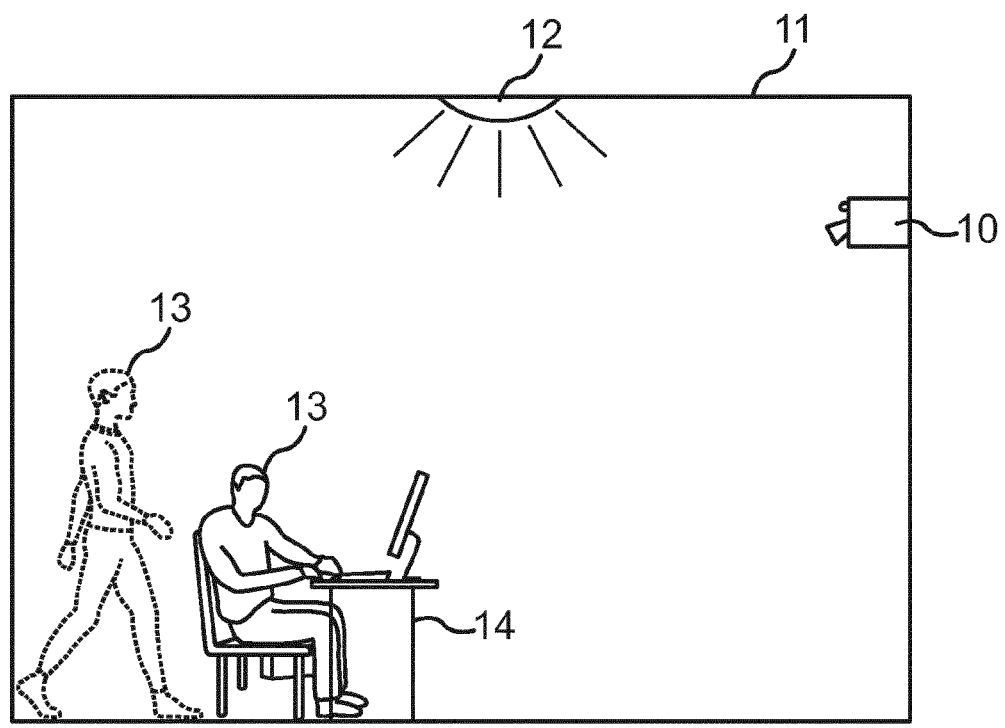

In FIG. 2, the employment of a presence detection device 10 is schematically illustrated. It is installed in a room 11 of a building not presented in more detail. A lamp 12 is located at the ceiling of this room. As soon as a person 13 enters the room, the movement detection unit 2 of the presence detection device 10 captures it. Namely, the person 13 is in movement upon entering the room 11. Thereby, the presence of the person 13 in the room 11 is certain and the presence detection device can output a corresponding control signal for turning on the lamp 12.

However, if the person 13 for example now sits down at a table 14 and then does not or barely move anymore, the movement detection unit 2 can no longer perceive it. However, the person 13 is present in the room 11. But since the camera 4 and the evaluation unit 5 of the presence detection device 10 now are activated by the movement detection unit 2, presence detection is now effected via the image processing of the evaluation unit 5. For example, the evaluation unit 5 has learned to explicitly recognize a person in the room 11 or at the table 14. Then, the presence detection device 10 thus notices the presence of the sitting person 13 and thereby further keeps the camera 14 active and further provides the presence signal to the lamp 12 or the control device thereof in order that the lamp 12 further gives light.

Preferably, the lamp 12 generally remains turned on as long as the person is detected in the room 11 or the monitored environment. If the room or another area comprises multiple such lamps 12 and a person or multiple persons stay only in a certain partial area of the monitored environment, it is energetically advantageous to light only that partial area, in which the person or the multiple persons are located. Other partial areas, in which persons are not located, then cannot be lighted. Except for the partial area, in which the person or the persons are located, certain preset partial areas such as for instance emergency exit areas, service areas and the like can of course be lighted independently of the presence of the persons. Thus, certain light scenes, which are at least partially static, can be dynamically adapted.

Furthermore, the case can occur that a person moves in the monitored area or the monitored environment. In such a situation, it is advantageous to predict the movement path of the person. A light scene can then be selected with the predicted movement path, which mainly lights the predicted movement path.

Now, if a person is detected in the monitored area or the environment, it is no longer required to detect further movements since the camera 10 and the lamp 12, respectively, are already turned on. In this case, it is possibly beneficial to turn off the installed movement detector, e.g. the PIR sensor, to again save energy.

In a further scenario, the person 13 can leave the monitored room 11 or the environment. The value of the presence signal indicates it. Here, turning off the light can now be provided after a certain time interval (typically 10 sec to 1 min). Therein, the movement detector could be reinitialized or be turned on again for the dark period at the same time.

Only if the person 13 again leaves the room 11, neither the movement detection unit 2 nor the camera 4 and the evaluation unit 5, respectively, notices the person 13 such that the camera 4 and/or the evaluation unit 5 can optionally be turned off or deactivated with a certain time delay. However, the movement detection unit 2 and optionally the control unit 3 have to remain active in order that the new entry of the room by a person 13 can again be noticed.

With the availability of inexpensive digital cameras, the occupancy or presence detection by presence detection devices with such cameras also becomes suitable for the mass market. Accordingly, they can also be employed for various lighting concepts.

While standard movement detectors reliably operate also in darkness and can be employed for activating lightings, they are not suitable to recognize stationary objects and persons, respectively, and to provide a reliable corresponding presence signal. In contrast thereto, a camera-based occupancy or presence sensor based on standard CMOS sensor technology can provide reasonable presence signals with low lighting due to its low sensitivity only if sufficient lighting is ensured. Depending on the lighting situation, thus, an additional lighting is optionally to be turned on. The combination of a standard movement detector for initially activating and optionally for turning on a lighting with a presence sensor based on image processing of a video signal independently of a movement thus results in a reliable presence signal even in stationary situations.

The adjustment of the activation of the movement detection unit and of its timeout, respectively, should be selected sufficiently long (typically 10 sec) considering the evaluation speed of the camera-based presence recognition system to ensure that the video system connected thereto with its high-quality signal processing is capable of completely executing the task of presence detection for example of a person.

The invention claimed is:

1. A presence detection device for detecting a presence of an object in an environment, comprising:
    a movement detection unit for detecting a movement of the object in the environment of the presence detection device and for outputting a movement signal depending on the detections;
    a control unit for generating an activation signal depending on the movement signal, a camera configured to be activated by the activation signal, for obtaining a video signal of the environment of the presence detection device; and
    an evaluation unit for generating a presence signal corresponding to the presence of the object by evaluating the video signal, the evaluation unit is configured to perform a subtraction between an image of the video signal and a preset image of the environment of the presence detection device without the object to evaluate the video signal; wherein
    the camera is controllable by the control unit with the presence signal such that the camera is kept active at least as long as the presence of the object is determined by the evaluation unit.

2. The presence detection device according to claim 1, wherein the evaluation unit is configured to perform a similarity analysis between an image of the video signal and a preset picture of the object in evaluating the video signal and to output the corresponding presence signal upon reaching a preset threshold value.

3. The presence detection device according to claim 1, wherein the evaluation unit is configured to learn one or more characteristics in image data of the object to autonomously recognize the presence of the object based on the learned characteristic or characteristics in the video signal and to correspondingly output the presence signal.

4. The presence detection device according to claim 1, wherein the movement detection unit comprises an infrared sensor, by which a movement of the object is detectable based on infrared radiation.

5. The presence detection device according to claim 1, wherein the object is a person or an animal.

6. The presence detection device according to claim 1, further comprising a lighting unit configured to be activated by the activation signal.

7. The presence detection device according to claim 6, wherein the lighting unit remains turned on as long as the object is located in the environment according to the presence signal.

8. The presence detection device according to claim 1, wherein the camera comprises a video sensor sensitive in the spectral range of the visible daylight and also in the near infrared range.

9. The presence detection device according to claim 1, wherein the control unit is configured to continuously keep the presence detection device activated subsequent to an activation of the camera at least for a preset period of time.

10. The presence detection device according to claim 6, wherein the object is one or more persons detected in an area of the environment by the movement detection unit, wherein the lighting unit is controllable by the control unit for generating a lighting scene depending on the area.

11. The presence detection device according to claim 6, wherein the object is a person, who is detected by the movement detection unit in the environment, a movement path of the person in the environment is predictable by the movement detection unit, and the control unit is configured to control the lighting unit depending on the movement path.

12. The presence detection device according to claim 1, wherein the movement detection unit is configured to be turned off by the control unit as soon as an object is detected in the environment according to the presence signal.

13. The presence detection device according to claim 6, wherein the lighting unit is configured to be turned off by the control unit after a predetermined period of time depending on that point of time, at which the object leaves the environment according to the presence signal.

14. A method for detecting a presence of an object in a preset area, comprising:
    detecting a movement of the object in the preset area;
    generating a movement signal depending on the detection;
    generating an activation signal depending on the movement signal;
    by a camera, obtaining a video signal of the preset area triggered by the activation signal;
    generating a presence signal relating to the presence of the object in the preset area by evaluating the video signal; and
    performing a subtraction between an image of the video signal and a preset image of the environment of the presence detection device without the object to evaluate the video signal; wherein
    the camera is controlled by the presence signal such that the camera is kept active at least as long as the presence of the object is determined by the evaluation unit.

15. A presence detection device for detecting a presence of an object in an environment, comprising:
    a movement detection unit for detecting a movement of the object in the environment of the presence detection device and for outputting a movement signal depending on the detection;
    a control unit for generating an activation signal depending on the movement signal, a camera configured to be activated by the activation signal, for obtaining a video signal of the environment of the presence detection device; and an evaluation unit for generating a presence signal corresponding to the presence of the object by evaluating the video signal; wherein the evaluation unit is configured to perform a similarity analysis between an image of the video signal and a preset picture of the object to evaluate the video signal and to output the corresponding presence signal upon reaching a preset threshold value; wherein the camera is controllable by the control unit with the presence signal such that the camera is kept active at least as long as the presence of the object is determined by the evaluation unit.

16. The presence detection device according to claim 15, wherein the evaluation unit is configured to learn one or more characteristics in image data of the object to autonomously recognize the presence of the object based on the learned characteristic or characteristics in the video signal and to correspondingly output the presence signal.

17. The presence detection device according to claim 15, wherein the movement detection unit comprises an infrared sensor, by which a movement of the object is detectable based on infrared radiation.

18. The presence detection device according to claim 15, further comprising a lighting unit configured to be activated by the activation signal.

19. The presence detection device according to claim 18, wherein the lighting unit remains turned on as long as the object is located in the environment according to the presence signal.

20. The presence detection device according to claim 15, wherein the camera comprises a video sensor sensitive in the spectral range of the visible daylight and also in the near infrared range.

\* \* \* \* \*